United States Patent
Fribus et al.

(10) Patent No.: US 10,352,440 B2
(45) Date of Patent: Jul. 16, 2019

(54) SHIFT-BY-WIRE ACTIVATION DEVICE AND METHOD FOR SELECTING DRIVING POSITIONS

(71) Applicant: ZF Friedrichshafen AG, Friedrichshafen (DE)

(72) Inventors: Vitali Fribus, Dinklage (DE); Alexander Kirilenko, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 522 days.

(21) Appl. No.: 15/027,371

(22) PCT Filed: Sep. 10, 2014

(86) PCT No.: PCT/EP2014/069241
§ 371 (c)(1),
(2) Date: Apr. 5, 2016

(87) PCT Pub. No.: WO2015/051960
PCT Pub. Date: Apr. 16, 2015

(65) Prior Publication Data
US 2016/0245402 A1    Aug. 25, 2016

(30) Foreign Application Priority Data

Oct. 10, 2013    (DE) .................. 10 2013 220 404

(51) Int. Cl.
*F16H 61/22*        (2006.01)
*B60R 25/25*        (2013.01)
(Continued)

(52) U.S. Cl.
CPC .......... *F16H 61/22* (2013.01); *B60R 25/007* (2013.01); *B60R 25/252* (2013.01); *F16H 59/08* (2013.01);
(Continued)

(58) Field of Classification Search
CPC ...... F16H 59/08; F16H 59/0278; F16H 61/18; F16H 61/22; F16H 2059/081; B60R 25/007
USPC .............................. 74/473.3, 473.12, 473.23
See application file for complete search history.

(56) References Cited

U.S. PATENT DOCUMENTS

| | | |
|---|---|---|
| 2003/0029261 A1 | 2/2003 | DeJonge |
| 2004/0041689 A1 | 3/2004 | DeBono |

(Continued)

FOREIGN PATENT DOCUMENTS

| | | |
|---|---|---|
| DE | 10208387 A1 | 10/2002 |
| DE | 10212777 A1 | 10/2003 |

(Continued)

OTHER PUBLICATIONS

International Search Report dated Oct. 30, 2014 in International Application No. PCT/EP2014/069241, 3 pages.

(Continued)

*Primary Examiner* — William C Joyce
(74) *Attorney, Agent, or Firm* — Brinks Gilson & Lione (57) ABSTRACT

A shift-by-wire actuator and a method for selecting drive positions of a motor vehicle transmission is provided. The actuator comprises an actuating field, in which a scrolling surface for selecting one of the drive positions, and a release button, which transmits a release signal based on an actuation, are disposed. The actuator is characterized in that the scrolling surface and the release button are coupled via a locking and releasing mechanism, such that a shift-effecting selection of at least one of the drive positions can be executed by manipulation of the scrolling surface after release by the locking and releasing mechanism, based on the release signal.

16 Claims, 2 Drawing Sheets

(51) Int. Cl.
*F16H 59/08* (2006.01)
*B60R 25/00* (2013.01)
*F16H 59/02* (2006.01)
*F16H 61/18* (2006.01)

(52) U.S. Cl.
CPC .......... *F16H 59/0278* (2013.01); *F16H 61/18* (2013.01); *F16H 2059/081* (2013.01)

(56) References Cited

U.S. PATENT DOCUMENTS

2004/0110600 A1 6/2004 Sekino
2012/0006139 A1 1/2012 Kim
2012/0096980 A1* 4/2012 Schramm ............. B62D 15/025
74/552

FOREIGN PATENT DOCUMENTS

| DE | 10348221 A1 | 5/2005 |
| DE | 102005017013 B4 | 10/2006 |
| DE | 102006010909 A1 | 9/2007 |
| DE | 102006019065 A1 | 10/2007 |
| DE | 102007023281 A1 | 11/2008 |
| DE | 102009031649 A1 | 1/2011 |
| FR | 2943160 A1 | 9/2010 |
| JP | 11-264459 * | 9/1999 |
| WO | 2010103221 A1 | 9/2010 |

OTHER PUBLICATIONS

International Search Report and Written Opinion dated Oct. 30, 2014 in International Application No. PCT/EP2014/069241, 11 pages, German Language.
International Report on Patentability, dated Apr. 2, 2015 in International Application No. PCT/EP2014/069241, 16 pages, German Language.
Search Report dated Jun. 24, 2014 in German Application No. DE 10 2013 220 404.3, 9 pages, German Language, including English Translation of p. 7.

* cited by examiner

SHIFT-BY-WIRE ACTIVATION DEVICE AND METHOD FOR SELECTING DRIVING POSITIONS

CROSS-REFERENCE TO RELATED APPLICATIONS

This application is a filing under 35 U.S.C. § 371 of International Patent Application PCT/EP2014/069241, filed Sep. 10, 2014, and claims the priority of DE 10 2013 220 404.3, filed Oct. 10, 2013. These applications are incorporated by reference herein in their entirety.

BACKGROUND OF THE INVENTION

The present disclosure relates to a shift-by-wire actuator and a method for selecting drive positions of a motor vehicle transmission.

With shift-by-wire actuators, the transmission of shift commands from the actuator to the motor vehicle transmission, in contrast to purely mechanical actuators, occurs by means of electrical or electronic signals. The change from the purely mechanical actuator to electrical or electronic actuators was triggered in that new constructive and ergonomic assemblies were constantly being provided for actuators for motor vehicle transmissions, wherein, despite everything, a reliable operability of the motor vehicle transmission actuator was to remain ensured, even without having to examine the actuator or the actuating element pertaining thereto.

A generic shift-by-wire actuator is disclosed, for example, in DE 10 2007 037 706 A1. The previously known actuator comprises a sliding element that moves in a translational manner for the manual shifting of the motor vehicle transmission, wherein the sliding element exhibits a handle, on which a thumb wheel is provided for the manual selection of drive positions of the motor vehicle transmission. The translational sliding characteristic of the sliding element is used thereby for a typical touch-shift gate in a motor vehicle automatic transmission, while the thumb wheel disposed on the handle serves as an automatic gate. By means of the thumb wheel, a selection of at least the drive positions for forwards driving, or "Drive" D, "Reverse" R and idle or "Neutral" N, respectively, are thus possible. The drive position "Park" P can be engaged via an additional actuator.

The previously known actuator furthermore comprises a shift-lock locking mechanism, by means of which an unintentional selection of one of the drive positions R and D from the park locking position P is to be prevented. In order to deactivate the park locking P, or to select one of the drive positions R and D from the park locking position P, first an actuation of the brake as well as a simultaneous actuation of the actuator is necessary. Alternatively, it is provided that the parking lock can only be released by means of the additional parking lock actuating element.

BRIEF SUMMARY OF THE INVENTION

Based on the generic prior art, an improved shift-by-wire actuator is to be provided by the present disclosure, which is suited to the constantly growing structural and ergonomic demands as well as safety requirements, in that at least one unintentional selection of drive positions, in particular starting from a drive position other than the park locking position can be reliably prevented.

For this, a shift-by-wire actuator having the features of the claims is proposed with the present disclosure. The proposed actuator is intended, in particular, for a motor vehicle automatic transmission or a motor vehicle automat-transmission, respectively. The proposed actuator comprises an actuating field, in which at least one scrolling surface for selecting one of the drive positions, and one release button, which transmits a release signal based on an actuation, are disposed. Preferably, at least the drive positions, "Drive" D, "Neutral" N, and "Reverse" R can be selected via the scrolling surface. More preferably, the drive position "Park" P can also be selected via the scrolling surface. Also preferably, at least one other drive position can be selected via the scrolling surface.

An actuating field is preferably a region, which is located within an access range of a user of the actuator, and is delimited by at least the visible dimensions of the actuator in the access range. Preferably, the actuator also comprises a housing section disposed in the access range of the user, the housing surface side of which forms or accommodates the actuating field, wherein an edge delimiting the accessible region of the housing section defines a maximum dimension of the actuating field. An edge of this type can, more preferably, be formed by the housing section of the actuator itself, or alternatively, formed by an element that can be disposed on the actuator, such as a central console cover having a cut-out, which exposes the accessible housing section.

A scrolling surface is preferably a moving control surface, which can be moved back and forth. Preferably, the scrolling surface is formed by a user interface of a scroll wheel that can rotate about a rotational axis, wherein the rotatability of the scroll wheel, or the user interface, respectively, is preferably limited or unlimited in at least one direction. The drive position is selected by rotating the scroll wheel. Alternatively, the scroll surface is preferably formed by a stationary user interface, in particular a touch-sensor surface, on which a user must slide his finger back or forth, once or more, in a manner corresponding to a scrolling movement, in order to select a drive position.

The actuator is distinguished in that the scrolling surface and the release button are coupled to one another via a locking and releasing mechanism, such that a shifting selection of at least one drive position, preferably a shift-effecting selection of the drive positions by means of the scrolling surface can be executed, in particular, exclusively after release thereof by means of the locking and releasing mechanism, based on the release signal. The selection then effects a shifting thereby, when the selection of the at least one drive position by means of the scrolling surface results in a corresponding shifting of the motor vehicle transmission.

In contrast to the previously known prior art, a shift-effecting selection of a drive position from the selectable drive positions is blocked by means of the actuator until a release signal is received, by means of which an unintentional actuation of a drive position selection element, as well as a resulting selection of a drive position other than the current drive position, can be reliably prevented. This is because, in order to release the shift-effecting selection of a drive position other than the drive position selected up until then, in contrast to the prior art, a release signal through the actuation of a release button is first required. Furthermore, in differing from typical actuators, a smaller, space saving actuator can be created with the present disclosure by means of a completely different design for the gearshift lever, in particular by eliminating a typical gearshift lever rod, which establishes a connection of an actuator that is freely accessible to the user to the mechanical or electrical system for transmitting the selected drive position.

According to a preferred embodiment, the actuator furthermore comprises a sensor device, having at least a signal transmitter and a signal receiver. Preferably, more than one signal transmitter or more than one signal receiver can be provided, by means of which a signal precision can be increased. The signal transmitter is coupled to the scrolling surface such that an actuation of the scrolling surface leads to a signal transmitted by the signal transmitter being triggered, which contains data regarding a selected drive position. An actuation of the scrolling surface can be detected by the signal transmitter and the signal receiver, and data derived from the actuation of the scrolling surface regarding a selected drive position can be transmitted by means of a signal.

A typical electronic sensor system can be used for the sensor device. By way of example, a position sensor technology based on the Hall effect can be used in combination with the preferred scroll wheel, wherein the signal transmitter, which can be a permanent magnet or an electromagnet, is connected in a stationary manner to the scroll wheel. Alternatively, a typical electronic touch sensor technology can be used in combination with the preferred touch sensor surface. The selectable drive positions are determined by the scrolling surface thereby, such that an identification of the selected drive position, depending on an actuation of the scrolling surface, is possible. The data recorded and transmitted by the sensor device regarding the selected drive position effects a shifting of the motor vehicle transmission corresponding to the selected drive position. By way of example, the data regarding the selected drive position can be transmitted by means of a sensor signal from the sensor device to the transmission control device, which, on the basis of the data transmitted with the sensor signal regarding the selected drive position, causes a corresponding shifting of the motor vehicle transmission. Alternatively thereto, a further control device or evaluation unit can be disposed between the sensor device and the transmission control device, which first processes the sensor signal, or the data transmitted with the sensor signal, regarding the selected drive position, e.g. evaluates it, and subsequently transmits it further.

Preferably the locking and releasing mechanism is configured for blocking and releasing a transmission of a signal having data regarding a selected drive position, wherein the locking and releasing mechanism is disposed in a transmission path, by means of which the signal having data regarding the selected drive position can be transmitted, and which extends from the scrolling surface to the motor vehicle transmission, and blocks the transmission of the signal having the data regarding the selected drive position, at least until receiving the release signal.

The manner and type of signal transmission can occur in a variety of ways, and is not substantial to the present disclosure. By way of example, an electric, inductive or optical signal transmission, or a combination thereof, having corresponding interfaces disposed therein, is conceivable.

The transmission path preferably comprises at least wiring paths or air gaps, via which, in any case, a transmission of the signal with the data regarding the selected drive position occurs. By way of example, with a Hall sensor based positioning sensor system, an air gap is present between the signal transmitter and the signal receiver, via which data transmitted by the signal transmitter regarding the selected drive position can be transmitted to the signal receiver by means of a signal or can be accessed by the signal receiver. Furthermore, by way of example, a signal line, e.g. an electrical connecting line, may be used, for example, from the signal receiver to the motor vehicle transmission as a part of the transmission path for the data regarding the selected drive position. With the preferred touch sensor surface serving as the scrolling surface, the signal line already originates, for example, in the signal transmitter. Additionally, or alternatively, preferably all of the devices or mechanisms between the scrolling surface to the motor vehicle transmission that process, e.g. evaluate, transmit, convey, or suchlike, the data regarding the selected drive position, are comprised in the transmission path. The devices or mechanisms can likewise also comprise or accommodate signal lines as wiring paths for transmitting a signal having the data regarding the selected drive position. In other words, the locking and releasing mechanism is thus configured to block and release a transmission of a signal having the data regarding the selected drive position in a region of the transmission path, which can comprise at least an air gap and/or wiring path and/or at least one device or mechanism. Preferably, the locking and releasing mechanism can allow, or release, in each case, the transmission of the signal having the data regarding the selected drive position, in response to the release signal triggered by an actuation of the release button, by means of a shifting element, which disengages and engages the wiring path, a shielding element, which can be inserted into and removed from the air gap and shields the transmission of the signal having the data regarding the selected drive position, or a blocking program for a software controlling the devices or mechanisms.

By means of the actuator, in contrast to the previously known prior art, a transmission of a signal having data regarding a selected drive position is blocked, after selecting the drive position, until a release signal has been received, by which means an unintentional actuation of a drive position selection element, as well as an accompanying selection of a drive position other than the current drive position, can be reliably prevented. This is because, in order to release a transmission of a signal having data regarding the selection of a drive position that is different than the currently selected drive position, in contrast to the prior art, an actuation of a release button is first required, by means of which, offset to the release signal, and first based thereon, a transmission of the signal having the data regarding the selected drive position is released, or possible, respectively. Furthermore, in differing from typical actuators by means of a completely different design for the gearshift lever, a smaller, space saving actuator is created, in particular by eliminating a typical gearshift rod, which establishes a connection of an actuating element, which is readily accessible to the user, to the mechanics or electronics for transmitting the selected drive position.

According to a preferred embodiment, the release button is configured to transmit a release signal that is sustained during the time period of the actuation. Furthermore, the locking and releasing mechanism is configured to allow a transmission of the signal having the data regarding the selected drive position for only the time period in which the release signal is transmitted. As a result, it is ensured that a shift-effecting selection of a drive position is to be carried out intentionally by the actuation of another actuating element, specifically the release button, for the duration of the selection. The selection then effects a shifting thereby, when the signal having the data regarding the selected drive position causes a corresponding shifting of the motor vehicle transmission. If the release button is not actuated further, then preferably a blocking of a transmission of the signal having the data regarding the selected drive position occurs at the same time that the actuation is brought to an end. The last signal transmitted during the actuation of the release button, having data regarding the selected drive position, is preferably used for a corresponding shifting of the motor vehicle transmission.

According to an alternative, preferred embodiment, the release button is configured to transmit a blocking signal in response to a further actuation. Furthermore, the locking and releasing mechanism is configured to block a transmission of the signal having the data regarding a selected drive position when, or after, it has received the blocking signal, until a subsequent release signal has been received. In contrast to the preferred embodiment described above, the release button does not need to be actuated continuously during the drive position selection in order to release a transmission of a signal having data regarding the selected drive position. With this preferred embodiment, a single actuation of the release button is sufficient to place the actuator in a releasing state, in which at least one transmission of the signal having the data regarding the selected drive position occurs. Only after a repeated, or renewed actuation of the release button is the actuator, based on the blocking signal emitted by the release button, placed in a locked state, in which a transmission of the signal having the data regarding the selected drive position is blocked.

It is furthermore preferred that the locking and releasing mechanism is configured, when there is no blocking signal, to block a transmission of the signal having the data regarding the selected drive position after a predetermined time period has elapsed after receiving the release signal, or after the completion of an actuation of the scrolling surface for selecting one of the drive positions. By this means, it can be ensured that the actuator is not accidently left for an undetermined time period in the release state.

According to a preferred embodiment, the locking and releasing mechanism comprises a moving locking element, which, in the initial state, engages with a scroll wheel forming the scrolling surface for blocking a rotational movement of the scroll wheel, and is configured to release the engagement in order to release the rotational movement of the scroll wheel, based on the release signal.

The locking and releasing mechanism preferably comprises an electromagnetic actuator having a retractable and extendable anchor forming or supporting the moving locking element, which, in an extended state, establishes the engagement with the scroll wheel for blocking the rotational movement, and in a retracted state, releases the rotational movement of the scroll wheel. Furthermore, it is preferred that, when the electromagnetic actuator is in the extended state, and thus the locking state, it is not supplied with current, and when it is in the retracted state, and thus the releasing state, it is supplied with a current, which is initiated when the release button is actuated. An energy expenditure from the actuator can be kept low in comparison to a reversed configuration of the electromagnetic actuator. The control of the electromagnetic actuator can be preferably obtained via a control mechanism, which is coupled to the release button and the electromagnetic actuator. Alternatively, the release button can be designed as a push button, which activates a circuit supplying the electromagnetic actuator when it is actuated, and when not actuated, deactivates the circuit, by means of which the electromagnetic actuator is no longer supplied with a current.

Alternatively, the locking and releasing mechanism preferably comprises a mechanical assembly reaching from the release button to the moving locking element, which, when the release button is actuated, brings the moving locking element into the disengaged state, thus the released state, and when it is not actuated, or released, respectively, brings the release button automatically into the engaged state. As a result, a cost-effective actuator can be provided.

According to a preferred embodiment of the present disclosure, the scroll wheel is configured to be mono-stable or multi-stable. As set forth in the present disclosure, a mono-stable configuration of the scroll wheel is understood to be a configuration in which the scroll wheel can be moved between two end positions, having a standby position located therebetween, wherein the scroll wheel automatically returns to the standby position after reaching an end position. A next drive position in the series is assigned to the respective end positions, depending on a selected starting drive position. By way of example, the predefined series can be the drive positions P, R, N, and D, wherein the last selected starting drive position is the drive position N, and the respective end positions, which are provided in opposing rotational directions of the scroll wheel, are the drive positions R and D, which are adjacent to the starting drive position N, in accordance with the aforementioned series. This enables a simple up- and down-shifting of the motor vehicle transmission. For this, the actuator has a control mechanism, or is coupled to such, which automatically assigns the respective end positions of the scroll wheel to a drive position that is directly adjacent to the drive position last selected, in accordance with a defined sequence of the drive positions.

With the preferred multi-stable configuration of the scroll wheel, the actuator has a latching mechanism coupled to the scroll wheel, which provides a number of latching positions for the scroll wheel corresponding to the number of selectable drive positions. Preferably, the scroll wheel can rotate without limit in at least one of the two opposing directions of rotation. The latching mechanism can be a typical latching mechanism equipped with shift-by-wire actuators.

The mono- or multi-stable configuration of the scroll wheel enables a haptic feedback for the user when selecting the appropriate drive position.

According to the present disclosure, the scrolling surfaces and the release button are disposed such that, in particular, it is possible for the user to actuate both of these components simultaneously with one hand. Thus, the proposed actuator can be operated in a simple manner. According to a preferred embodiment, the release button is intended to be actuated by the thumb and the scroll surface is to be actuated by another finger, preferably the index or middle finger. The operability of the actuator can be further simplified thereby.

According to a preferred embodiment, the actuating field comprises a wrist rest, which exhibits or forms the release button. Preferably, the release button is disposed in a recess in the wrist rest, or on a surface of the wrist rest. Furthermore preferred, the wrist rest can preferably comprise a sensor surface, which emits the corresponding release signal when the user touches it. Alternatively, the wrist rest itself forms the release button. It is further preferred that the wrist rest itself is designed as a push-button element.

According to a preferred embodiment, the release button is designed to identify a user of the actuator by means of a fingerprint sensor, wherein the release button is coupled to an identification device, which executes a comparison of a fingerprint recorded via the release button with a fingerprint that is filed, or stored, in the identification device, and when the fingerprints match, emits a signal to the locking and releasing mechanism to release the transmission of the signal having data regarding the selected drive position by the locking and releasing mechanism. As set forth in the present disclosure, the fingerprint transmitted from the release button to the identification device already corresponds to a release signal, as long as the recorded fingerprint matches the stored fingerprint. As a result, a shifting of the motor vehicle transmission by an unauthorized user can be prevented, by means of which the actuator can be used in combination with a motor vehicle anti-theft protection device.

According to a preferred embodiment, the actuator comprises a display device for displaying at least the selected drive position. It is further preferred that the display device is also configured to display the selectable drive positions, wherein the currently selected drive position is highlighted in comparison to the selectable drive positions by means of a different color or increased brightness. It is further preferred that the display device is disposed in the actuating field. The display device is connected, directly or indirectly, to the locking and releasing mechanism, such that data regarding the selected drive position can be depicted via the display device. A direct connection to the locking and releasing mechanism requires a connection without other devices or mechanisms connected therebetween. An indirect connection requires at least one device or mechanism to be connected therebetween, such as a control device, which processes a signal having the data regarding the selected drive position.

According to another aspect of the present disclosure, a method for selecting drive positions of a motor vehicle transmission by means of a shift-by-wire actuator is provided, wherein the actuator can be, in particular, an actuator of the type described above. The proposed method comprises a step for the actuation of a release button for emitting at least one release signal for releasing a transmission of a signal having data regarding a selected drive position based on an actuation of a scroll surface, by means of which a selection of the drive positions depending on its actuation can be carried out. Furthermore, the method comprises a step for selecting a drive position by actuating the scroll surface. Preferably, the method further comprises a step for transmitting the signal having data regarding the selected drive position after selecting the drive position. It is further preferred that the method comprises a successive step for blocking a transmission of a signal having data regarding a selected drive position until a release signal is received. An unintentional, shift-effecting selection of one of the drive positions by an unintended actuation of the scroll surface can be reliably prevented with the method.

Further features and advantages of the disclosure can be derived from the following description of preferred exemplary embodiments of the disclosure, based on the figures and drawings, which show details that are substantial to the disclosure, and from the claims. The individual features can be implemented in and of themselves, or in numerous arbitrary combinations in a preferred embodiment of the disclosure.

BRIEF DESCRIPTION OF THE SEVERAL VIEWS OF THE DRAWINGS

Preferred exemplary embodiments of the disclosure shall be explained below based on the attached drawings. Therein.

DETAILED DESCRIPTION OF THE INVENTION

Figure 1:
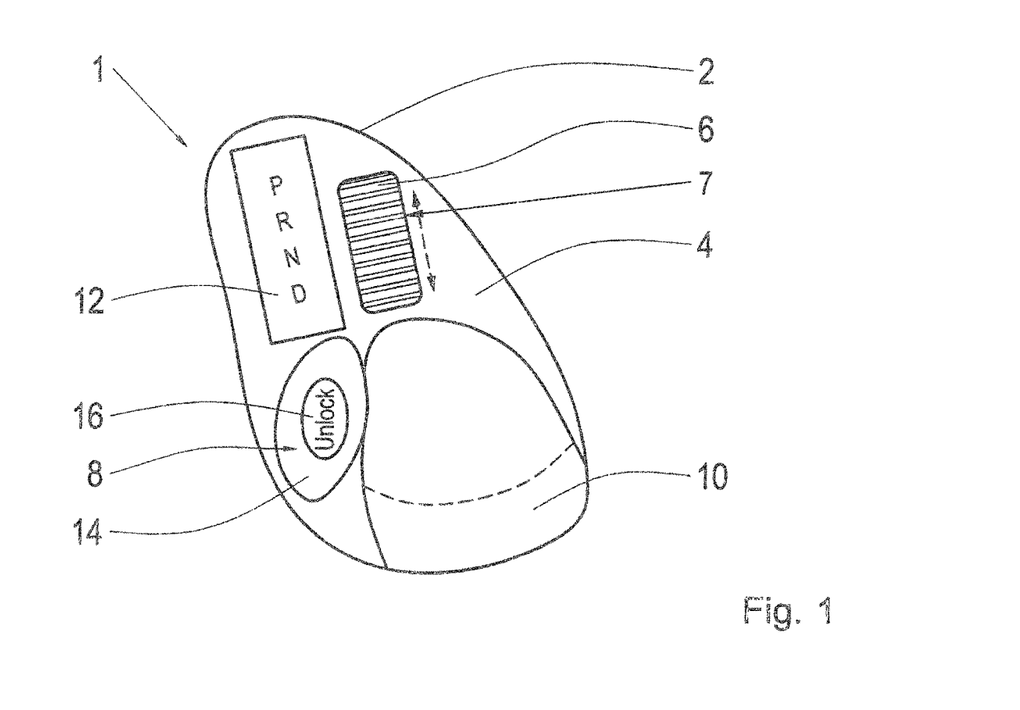
FIG. 1 shows a perspective top view of an actuator according to a preferred exemplary embodiment.

FIG. 1 shows a perspective top view of a shift-by wire actuator 1 according to a preferred exemplary embodiment. The actuator 1 comprises a housing 2, which can be placed in, or disposed on, a central console of a motor vehicle. The housing 2 can be composed of one or more housing elements. The housing 2 has an actuating field 4, which corresponds to a visible region of the housing 2 in an installed state in the central console. A scroll wheel 7 with a scrolling surface 6, a release button 8, a wrist rest 10, and a display for displaying a selectable and a selected drive position of a motor vehicle transmission are disposed in the actuating field 4. The scroll wheel 7, having the scrolling surface 6, can be rotated in opposing directions of rotation. The scroll wheel 7 can be configured in a mono-stable or multi-stable manner. With a mono-stable design of the scroll wheel 7, the scroll wheel can be rotated in each of the directions of rotation until reaching a perceptible end stop. The rotational path is set through a corresponding adjustment of the angle of rotation, or the turning angle. The setting can be obtained in advance, or during operation, by means of an electronic unit, in order to be able to provide a tailored rotational path for the scroll wheel 7, or the scrolling surface 6. The rotational path of the scrolling surface 6 in each of the opposing rotational directions can be identical or different thereby. The scrolling surface 6, or the scroll wheel 7 is also designed to automatically rotate back to its starting position as soon as it is brought out of the starting position.

With a multi-stable design of the scroll wheel 7, the scroll wheel can be rotated into numerous latching positions in respective opposing rotational directions, wherein the scroll wheel 7 can either rotate without limit, or after reaching an outermost drive position, according to a drive position sequence, ends up in an end position. The scroll wheel 7 is coupled to a sensor device (not shown) for detecting a rotational movement of the scroll wheel 7 or the scrolling surface 6. The detection of the rotational movement of the scroll wheel 7, or the scrolling surface 6, can occur in typical manner, optically, magnetically, in particular based on Hall sensors, or in other typical known manners. A predefinable rotational path of the scroll wheel 7, or the scrolling surface 6, respectively, is assigned thereby to a selectable drive position in each case. The scroll wheel 7 can select, by way of example, one of the drive positions "Park" P, "Reverse" R, "Neutral" N, or "Drive" D. The drive position "Park" P does not necessarily have to be selectable by means of an actuation of the scrolling surface 6, or the scroll wheel 7, respectively. The "Park" position P can, for example, be able to be closed or opened by means of an additional actuation element.

In order to display a selection of the drive position selected via the scrolling surface 7 to the user, the actuator 1 has a display device 12 in the actuating field. The display device 12 shows, on one hand, the selectable drive positions, as well as, on the other hand, by means of colored highlighting in relation to the other drive positions, the current drive position selected via the scrolling surface 6. The display device 12 can be a display unit illuminated by a lamp thereby, e.g. an LED display, or a programmable display, by means of which a variable, tailored adjustment of the display is possible. The display device 12 need not necessarily be disposed in the actuating field 4. By way of example, the display device 12 may be provided, in another preferred embodiment, in a mount in the field of vision of a driver of the motor vehicle. An arrangement of a display device for displaying the selectable and selected drive positions in addition to the display device 12 is likewise conceivable.

The wrist rest 10 is disposed such, and dimensioned such, that a user of the actuator can rest his hand, or the palm of his hand, respectively, comfortably on the wrist rest 10, and reach the actuating elements in the actuating surface 4, i.e. at least the scrolling surface 6 and the release button 8, with his fingers, and can actuate these elements. Preferably, the wrist rest 10 is provided as a replaceable module for the actuator 1, in order to be able to provide a wrist rest adapted to the size of a user's hand with the actuator 1.

The scrolling surface 6 and the release button 8 are disposed in the actuating field 4 such that the release button 8 can be actuated with a user's thumb, and the scrolling surface 6 can be actuated by means of an index or middle finger on a user's hand. The release button 8 has a depression designed to correspond to the surface of the thumb, in order to enable a comfortable actuation feeling and a comfortable seat for the thumb on the release button. A signal triggering button 16 for actuation by the thumb is disposed in the vicinity of the depression 14. The button 16 can be a push button or a sensor button, for example.

When the button 16 is actuated, a release signal is emitted by the release button 8 to a locking and releasing mechanism 18.

According to a preferred exemplary embodiment, the locking and releasing mechanism has an electric drive having a retractable and extendable anchor. The electrical drive can be an electromagnetic actuator, for example. The anchor is extended in a currentless state of the electrical drive, and engages with the scroll wheel 7 when in the extended state, in order to block a rotational movement thereof. For this, the scroll wheel 7 has at least one engagement point for the anchor. By way of example, one engagement point may be provided for each drive position that can be selected with the scroll wheel 7, in which the anchor can engage after a drive position has been selected, in order to suppress the rotational movement of the scroll wheel 7. When the electric drive is subjected to a current, the anchor is retracted, and releases the rotational movement of the scroll wheel 7. The retracted state of the anchor is caused by means of an actuation of the release button 8, or the release signal, respectively. The release signal 8 is coupled to the locking and releasing mechanism such that, based on the release signal emitted by the release button 8 after actuation thereof, a circuit of the electric drive for providing it with current is closed. By way of example, the release button 8 can be designed as a switch, which is connected directly to the circuit of the electric drive. The release button 8 forms both the locking mechanism and the release mechanism simultaneously thereby. Thus, when the release button 8 is actuated, the circuit is closed, while a release of the release button 8, or a non-actuation thereof leads to a currentless state of the electric drive.

Alternatively, the locking and releasing mechanism can have a mechanical assembly, which can bring a locking element, equivalent to the anchor, into an engaged state, thus a locked state, and into a disengaged state, thus a released state, based on an actuation of the release button 8. By way of example, a gearwheel mechanism connected to the locking element, or a rod connected to the locking element, or a combination thereof, may be provided. The release button 8 can be designed as a push button thereby, the actuation of which acts directly on the mechanism by means of a transference of force of the actuating force acting on the release button 8, such that the locking element can be brought out of the locked state into the released state, and can be returned to the locked state when not actuated.

Furthermore, the release button 8 can alternatively be designed as a sensor or touch button, which is connected to a control device, which can be a component of the locking and releasing mechanism. On the basis of an actuation of the release button 8, the control device transmits a signal that activates or deactivates the circuit of the electric drive at a switch disposed in the circuit, which is a component of the locking and releasing mechanism.

In general, the locking and releasing mechanism, which is not shown, is coupled to the scrolling surface 6, or the scroll wheel 7, or alternatively, with a sensor device, not shown, such that at least one shift-effecting transmission of a signal having data regarding the selected drive position is blocked until the release signal has been received.

The sensor device is a position sensor, based on a Hall sensor, having a permanent magnet or electromagnet as the signal transmitter, which is coupled to the scrolling surface 6, or the scroll wheel, respectively, and one or more Hall sensors serving as signal receivers, which is or are connected in a stationary manner to the housing 2. The signal transmitter is connected in a stationary manner to the scroll wheel 7, and is forced into movement via a rotational movement of the scroll wheel 7. The signal transmitter is coordinated to the signal receiver such that a predefined change in the magnetic field resulting from rotational movement of the signal transmitter corresponds to a predetermined selectable drive position. With a rotational movement of the scroll wheel 7, the signal receiver transmits a signal corresponding to the detected change in the magnetic field, wherein the change in the magnetic field corresponds to data regarding the selected drive position. The signal transmitted by the sensor device can be evaluated by a control device, which causes a shifting of the motor vehicle transmission, based on the data regarding the selected drive position transmitted with the signal.

Furthermore, according to a preferred exemplary embodiment, the locking and releasing mechanism is connected to a circuit of an electromagnet forming the signal transmitter, which is coupled to the scrolling surface 6, or the scroll wheel 7, respectively. The electrical connection of the electromagnets serving as the signal transmitter in or on the scroll wheel 7 or the scrolling surface 6, is secured in a bearing position of the scroll wheel 7, for example, via a sliding contact. Based on an actuation, and the resulting release signal of the release button 8, the circuit is closed, by means of which an interaction between the signal transmitter and the signal receiver is enabled for the identification of a selected drive position based on a change in the magnetic field and a signal emitted, based thereon, having the data regarding the selected drive position.

The release signal is transmitted, according to a preferred exemplary embodiment, for a time period corresponding to the actuation, or after actuation of the release button 8. According to another preferred exemplary embodiment, the locking and releasing mechanism is configured to transmit a locking signal for blocking the transmission of the signal having the data regarding the selected drive position until receiving another release signal in response to another actuation of the release button 8, which follows an actuation for triggering the release signal. It is further preferred that the locking and releasing mechanism is configured to block the transmission of the signal having the data regarding the selected drive position after a predefined time period after receiving the release signal, if such a locking signal is absent. As a result, it can be reliably ensured that an unintentional rotation of the scrolling surface 6 does not result in a shift-effecting signal transmission, accompanied by a shifting of the motor vehicle transmission after a predetermined time has elapsed.

Figure 2:
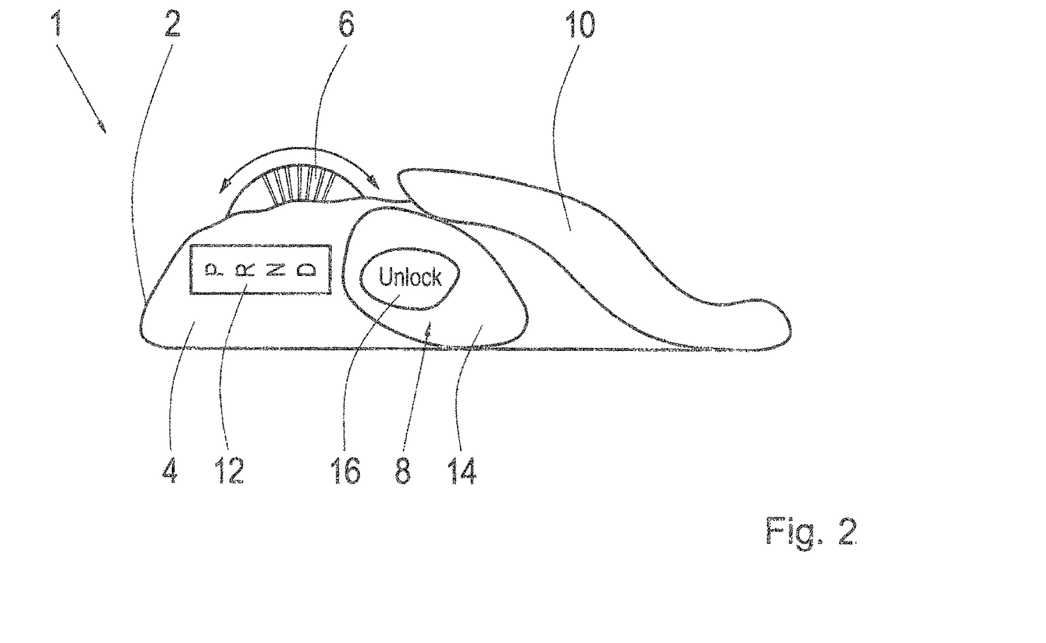
FIG. 2 shows a side view of the actuator shown in FIG. 1.

FIG. 2 shows a side view of the actuator 1 shown in FIG. 1. FIG. 2 illustrates a form of the actuator 1 that resembles a computer mouse, which enables a comfortable resting of the user's hand on the wrist rest 10, as well as a simple and comfortable operation of the actuator 1. Furthermore, the (not shown) sensor device and the locking and releasing mechanism can be disposed in the region beneath the actuating field 4, or on a side of the housing 2 facing away from the actuating field 4, or inside the housing 2, in a space saving manner.

Figure 3:
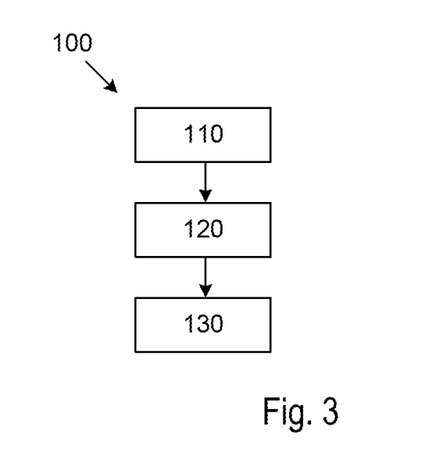
FIG. 3 shows a flow chart for a method for selecting drive positions of a motor vehicle transmission by means of a shift-by-wire actuator, according to a preferred exemplary embodiment.
Figure 4:
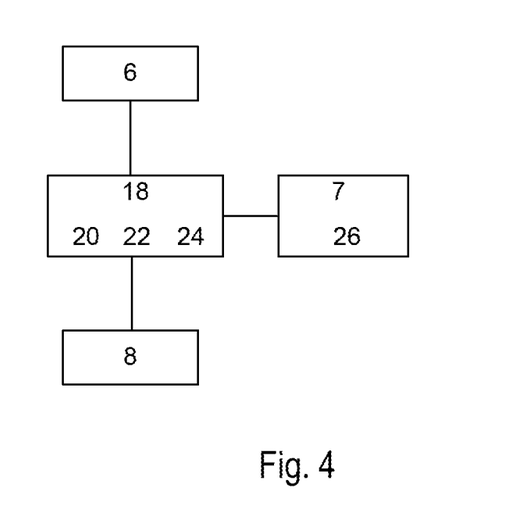
FIG. 4 shows a symbolic view of portions of an actuator according to an exemplary embodiment.

FIG. 3 shows a flow chart of a method for selecting drive positions of a motor vehicle transmission by means of a shift-by-wire actuator according to a preferred exemplary embodiment. The method shall be depicted below based on the actuator 1 described above. Starting from a locked state, in which a transmission of a signal regarding a selectable drive position is suppressed by the locking and releasing mechanism, the release button 8 is actuated in a first step 110, in order to trigger a release signal, which results in the release of a transmission of a signal toward the motor vehicle transmission, having data regarding a selected drive position. The locking and releasing mechanism stops the blocking, based on the actuation of the release button 8, and thus releases the relevant release signal, and allows a transmission of a signal having data regarding a selected drive position. The selection of the desired drive position occurs in a further step 120 through an actuation of the scrolling surface 6, by means of which a signal having the data regarding the desired drive position is transmitted toward the motor vehicle transmission, in order to cause a corresponding shifting of the motor vehicle transmission. Subsequently, the transmission of a signal having data regarding a selected drive position is again blocked in step 130. This can occur, depending on the design of the actuator 1, for example, through opening a circuit, which is provided for supplying current to an electric drive for locking a rotational movement of the scrolling surface 6 or the scroll wheel 7, or an electromagnet is provided, serving as a signal transmitter, which is coupled in a stationary manner to the scrolling surface 6 or the scroll wheel 7, or occurs in a manner other than those that can be derived from the preferred exemplary embodiments described above. An unintentional shift-effecting selection of a drive position through unintentional actuation of the scrolling surface can be prevented by means of the method 100.

The preferred exemplary embodiments described herein and illustrated in the figures are selected only by way of example. Different exemplary embodiments can be combined with one another, in their entirety or with respect to individual features. Furthermore, an exemplary embodiment can be supplemented by one or more features of another exemplary embodiment. The dimensions of the geometric shape of the elements described herein are selected only by way of example, and can be adjusted accordingly.

REFERENCE SYMBOLS

1 Actuator
2 Housing
4 Actuating Field
6 Scrolling Surface
7 Scroll Wheel
8 Release Button
10 Wrist Rest
12 Display Device
14 Depression
16 Button
18 Locking and Releasing Mechanism
20 Locking Element
22 Electric Drive
24 Anchor
26 Engagement Point
100 Method
110 Actuation Step
120 Rotation Step
130 Locking Step

The invention claimed is:

1. A shift-by-wire actuator for selecting drive positions of a motor vehicle transmission, the actuator comprising:
an actuating field comprising:
a scrolling surface for selecting one of the drive positions, and
a release button which transmits a release signal based on an actuation,
wherein the scrolling surface and the release button are coupled via a locking and releasing mechanism, such that a shift-effecting selection of at least one of the drive positions can be executed by the scrolling surface only after releasing by the locking and releasing mechanism, based on a release signal,
further comprising a sensor device comprising at least one signal transmitter and signal receiver, wherein the signal transmitter is coupled to the scrolling surface and interacts with the signal receiver for detecting an actuation of the scrolling surface, and for transmitting a signal having data regarding a selected drive position derived from the actuation of the scrolling surface, wherein the signal having the data regarding the selected drive position causes a shifting of the motor vehicle transmission corresponding to the selected drive position, wherein the locking and releasing mechanism is configured to block and release the transmission of the signal having the data regarding a selected drive position, wherein the locking and releasing mechanism is disposed in a transmission path of the signal having the data regarding the selected drive position from the scrolling surface to the motor vehicle transmission, and the transmission of the signal having the data regarding the selected drive position is blocked at least until the release signal has been received by the locking and releasing mechanism,
wherein the release button is configured to transmit a blocking signal in response to a subsequent actuation, and the locking and releasing mechanism is configured to block a transmission of the signal having data regarding the selected drive position when or after the blocking signal has been received until another release signal has been received,
wherein the locking and releasing mechanism is configured to block a transmission of the signal having data regarding the selected drive position after a predefined time period has elapsed after receiving the release signal in the absence of a blocking signal.

2. The actuator according to claim 1, wherein the release button is configured to transmit a release signal sustained for the time period of the actuation, and the locking and releasing mechanism is configured to allow a transmission of the signal having data regarding the selected drive position only for the time period of the transmission of the release signal.

3. The actuator according to claim 1 wherein the locking and releasing mechanism is formed by a moving locking element which is engaged with a scroll wheel disposed on the scrolling surface, wherein the moving locking element is configured to block a rotational movement of the scroll wheel in a starting position when the moving locking element is engaged with the scroll wheel and is configured to release the engagement for releasing the rotational movement of the scroll wheel based on the release signal.

4. The actuator according to claim 3, wherein the scroll wheel is configured as a mono-stable wheel.

5. The actuator according to claim 3, wherein the scroll wheel is configured as a multi-stable wheel.

6. The actuator according to claim 3, wherein the moving locking element is moved by an electric drive.

7. The actuator according to claim 6, wherein the moving locking element includes an anchor to engage the scroll wheel, wherein the anchor is configured for an extended position and a retracted position, wherein the anchor is in the extended position when the electric drive is in a currentless state and the anchor is in the retracted position when the electric drive is subjected to current.

8. The actuator according to claim 7, wherein the scroll wheel includes at least one engagement point for the anchor for each drive position that can be selected with the scroll wheel.

9. The actuator according to claim 1, wherein the release button is disposed in the actuating field for actuation by a thumb of a user's hand and the scrolling surface is disposed in the actuation field for actuation by another finger of the user's hand.

10. The actuator according to claim 1, wherein the actuating field further comprises a wrist rest comprising the release button.

11. The actuator according to claim 1, wherein the release button includes a fingerprint sensor for identifying a user of the actuator, wherein the release button is coupled to an identification device, which executes a comparison of the fingerprint recorded via the release button with a fingerprint stored in the identification device, and with a match, wherein a signal is emitted to the locking and releasing mechanism to release the transmission of the signal having the data regarding the selected drive position by the locking and releasing mechanism when the fingerprint recorded via the release button matches with a fingerprint stored in the identification device.

12. A method for selecting drive positions of a motor vehicle transmission with a shift-by-wire actuator according to claim 1, the method comprising:
   actuating the release button for releasing at least one transmission of data regarding a selected drive position based on an actuation of the scrolling surface, which selects a drive position depending on its actuation, and
   selecting a drive position by actuating a scrolling surface.

13. The method of claim 12, further comprising the step of blocking at least one transmission of data regarding a selected drive position based on an actuation of the scrolling surface.

14. The actuator according to claim 1, further comprising a display configured to display the selected drive position.

15. The actuator according to claim 14, wherein the display is disposed in the field of vision of a driver of the motor vehicle.

16. The actuator according to claim 1, wherein the sensor device is a Hall sensor with a permanent magnet or electromagnet as the signal transmitter and a Hall sensor as the signal receiver.

* * * * *